(12) United States Patent
Becene et al.

(10) Patent No.: US 11,280,550 B2
(45) Date of Patent: Mar. 22, 2022

(54) RADIALLY LAYERED HELICAL CORE GEOMETRY FOR HEAT EXCHANGER

(71) Applicant: Hamilton Sundstrand Corporation, Charlotte, NC (US)

(72) Inventors: Ahmet T. Becene, West Simsbury, CT (US); Gabriel Ruiz, Granby, CT (US); Feng Feng, South Windsor, CT (US); Michael Maynard, Springfield, MA (US); Michael Doe, Southwick, MA (US); Michele Hu, Manchester, CT (US); Ephraim Joseph, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/711,107

(22) Filed: Dec. 11, 2019

(65) Prior Publication Data
US 2020/0284517 A1    Sep. 10, 2020

Related U.S. Application Data

(60) Provisional application No. 62/815,838, filed on Mar. 8, 2019.

(51) Int. Cl.
| | | |
|---|---|---|
| *F28D 1/047* | (2006.01) | |
| *F28D 1/053* | (2006.01) | |
| *F28D 1/02* | (2006.01) | |

(52) U.S. Cl.
CPC ....... *F28D 1/0472* (2013.01); *F28D 1/05333* (2013.01); *F28D 2001/0273* (2013.01); *F28F 2210/02* (2013.01)

(58) Field of Classification Search
CPC ........ F28F 9/026; F28F 9/0263; F28F 9/0282; F28F 2009/029; F28F 2210/02;
(Continued)

(56) References Cited

U.S. PATENT DOCUMENTS

| | | | |
|---|---|---|---|
| 485,315 A | 11/1892 | Yaryan | |
| 1,655,086 A | * 1/1928 | Blanding | .......... F28B 1/02 |
| | | | 165/163 |

(Continued)

FOREIGN PATENT DOCUMENTS

| | | |
|---|---|---|
| DE | 202019102083 U1 | 4/2019 |
| EP | 3124906 A1 | 2/2017 |

(Continued)

OTHER PUBLICATIONS

Extended European Search Report for EP Application No. 19213258.7, dated May 8, 2020, 9 pages.

(Continued)

*Primary Examiner* — Paul Alvare
*Assistant Examiner* — Jose O Glass-Quinones
(74) *Attorney, Agent, or Firm* — Kinney & Lange, P.A.

(57) ABSTRACT

A heat exchanger includes a first fluid manifold extending along a first fluid axis from a first fluid inlet to a first fluid outlet. The first fluid manifold includes a first fluid inlet header, a first fluid outlet header, and a nested helical core section. The first fluid inlet header is disposed to fork the first fluid inlet into a plurality of first fluid branches distributed circumferentially and radially about the first fluid axis. The first fluid outlet header is disposed to combine the plurality of first fluid branches into the first fluid outlet. The nested helical core section fluidly connects the first fluid inlet header to the first fluid outlet header via a plurality of nested helical tubes, and includes radially inner and outer groups of circumferentially distributed helical tubes.

17 Claims, 2 Drawing Sheets

(58) Field of Classification Search
CPC ............ F28D 1/0472; F28D 7/16; F28D 7/02;
F28D 7/022; F28D 7/024; F28D 7/026;
F28D 7/028; F28D 7/04
See application file for complete search history.

(56) References Cited

U.S. PATENT DOCUMENTS

| | | | |
|---|---|---|---|
| 1,768,222 A | 6/1930 | Uhde | |
| 2,734,224 A | 2/1956 | Wnstead | |
| 2,798,361 A * | 7/1957 | Frederick | F02K 7/10 60/736 |
| 3,205,939 A * | 9/1965 | Huet | F22B 1/16 165/144 |
| 3,212,570 A | 10/1965 | Holman | |
| 4,058,161 A | 11/1977 | Trepaud | |
| 4,066,121 A * | 1/1978 | Kleine | B21D 53/045 165/170 |
| 4,451,960 A | 6/1984 | Molitor | |
| 4,570,703 A | 2/1986 | Ringsmuth et al. | |
| 5,388,635 A * | 2/1995 | Gruber | F28F 3/12 165/185 |
| 6,296,020 B1 | 10/2001 | McNeely et al. | |
| 6,679,083 B1 * | 1/2004 | Erickson | F25B 37/00 62/476 |
| 6,688,381 B2 * | 2/2004 | Pence | B01F 5/06 165/139 |
| 7,021,608 B2 * | 4/2006 | Lavemann | B01D 3/008 261/110 |
| 7,240,723 B2 | 7/2007 | Wu et al. | |
| 8,241,239 B2 | 8/2012 | Solomon et al. | |
| 8,528,628 B2 * | 9/2013 | Robinson | F28F 21/02 165/80.4 |
| 9,134,072 B2 | 9/2015 | Roisin et al. | |
| 9,279,621 B2 * | 3/2016 | Seybold | F25B 40/00 |
| 9,541,331 B2 | 1/2017 | Nagurny et al. | |
| 9,656,212 B2 | 5/2017 | DiBiasio et al. | |
| 9,964,077 B2 | 5/2018 | Neal et al. | |
| 9,976,815 B1 | 5/2018 | Roper et al. | |
| 10,048,019 B2 | 8/2018 | Karlen et al. | |
| 10,088,250 B2 | 10/2018 | Turney | |
| 10,267,515 B2 | 4/2019 | Adriany et al. | |
| 10,684,080 B2 | 6/2020 | Moore et al. | |
| 11,168,942 B2 | 11/2021 | Becene et al. | |
| 2003/0039169 A1 | 2/2003 | Ehrfeld et al. | |
| 2004/0195708 A1 | 10/2004 | Lavemann et al. | |
| 2008/0190586 A1 | 8/2008 | Robinson | |
| 2009/0269837 A1 | 10/2009 | Shevkoplyas et al. | |
| 2009/0274549 A1 | 11/2009 | Mitchell et al. | |
| 2009/0316972 A1 | 12/2009 | Borenstein et al. | |
| 2010/0096115 A1 * | 4/2010 | Erickson | F28D 7/024 165/156 |
| 2010/0297535 A1 | 11/2010 | Das et al. | |
| 2012/0125560 A1 | 5/2012 | McKeown et al. | |
| 2013/0206374 A1 | 8/2013 | Roisin et al. | |
| 2014/0262136 A1 | 9/2014 | Jensen | |
| 2015/0140190 A1 | 5/2015 | Cully et al. | |
| 2016/0116218 A1 | 4/2016 | Shedd et al. | |
| 2017/0030651 A1 * | 2/2017 | Rock, Jr. | F28D 7/0008 |
| 2017/0089643 A1 * | 3/2017 | Arafat | F28D 9/0093 |
| 2017/0191762 A1 | 7/2017 | Duelser et al. | |
| 2017/0205149 A1 | 7/2017 | Herring et al. | |
| 2017/0248372 A1 | 8/2017 | Emo et al. | |
| 2017/0328644 A1 | 11/2017 | Takahashi | |
| 2018/0038654 A1 | 2/2018 | Popp et al. | |
| 2018/0051934 A1 | 2/2018 | Wentland et al. | |
| 2018/0100703 A1 | 4/2018 | Beaver et al. | |
| 2018/0100704 A1 | 4/2018 | Lewandowski et al. | |
| 2018/0106550 A1 * | 4/2018 | Nelson | F28F 9/0263 |
| 2018/0266770 A1 | 9/2018 | Wagner et al. | |
| 2018/0283794 A1 | 10/2018 | Cerny et al. | |
| 2018/0283795 A1 | 10/2018 | Cerny et al. | |
| 2019/0024989 A1 | 1/2019 | Wilson et al. | |
| 2019/0086154 A1 | 3/2019 | Adriany et al. | |
| 2019/0366290 A1 | 12/2019 | Hofmann et al. | |
| 2020/0041212 A1 | 2/2020 | Palmer et al. | |

FOREIGN PATENT DOCUMENTS

| | | |
|---|---|---|
| EP | 0074570 A1 | 12/2018 |
| EP | 3410054 A1 | 12/2018 |
| FR | 453494 A | 6/1913 |
| GB | 588520 A | 5/1947 |
| JP | 2006322643 A | 11/2006 |
| WO | WO2010138061 A1 | 12/2010 |
| WO | WO2017052798 A1 | 3/2017 |
| WO | WO2018154063 A1 | 8/2018 |
| WO | 2018191787 A1 | 10/2018 |
| WO | WD2018182808 A1 | 10/2018 |

OTHER PUBLICATIONS

Extended European Search Report for EP Application No. 19216146.1, dated Jul. 2, 2020, 8 pages.
Extended European Search Report for EP Application No. 19216221.2, dated Jul. 28, 2020, 7 pages.
Extended European Search Report for EP Application No. 19216295.6, dated Jul. 22, 2020, 7 pages.
L. Luo, et al., "Constructal approach and multi-scale components" from Applied Thermal Engineering 27 (2007) pp. 1708-1714.
Extended European Search Report for EP Application No. 19215931.7, dated Jul. 28, 2020, 8 pages.
Communication Pursuant to Article 94(3) EPC for EP Application No. 19216221.2, dated Oct. 27, 2021, 6 pages.
Extended European Search Report for EP Application No. 21176197.8, dated Nov. 9, 2021, 8 pages.
L. Luo et al., "Integration of Constructal Distributors to a Mini Crossflow Heat Exchanger and Their Assembly Configuration Optimization", from Chemical Engineering Science 62, (2007) pp. 3605-3619.
L. Luo et al., Experimental Study of Constructal Distributor for Flow Equidistribution in a Mini Crossflow Heat Exchanger (MCHE), from Chemical Engineering and Processing 47, (2008) pp. 229-236.
Z. Fan, et al., "Numerical Investigation of Constructal Distributors with Different Configurations", from Chinese Journal of Chemical Engineering, 17(1), (2009) pp. 175-178.

* cited by examiner

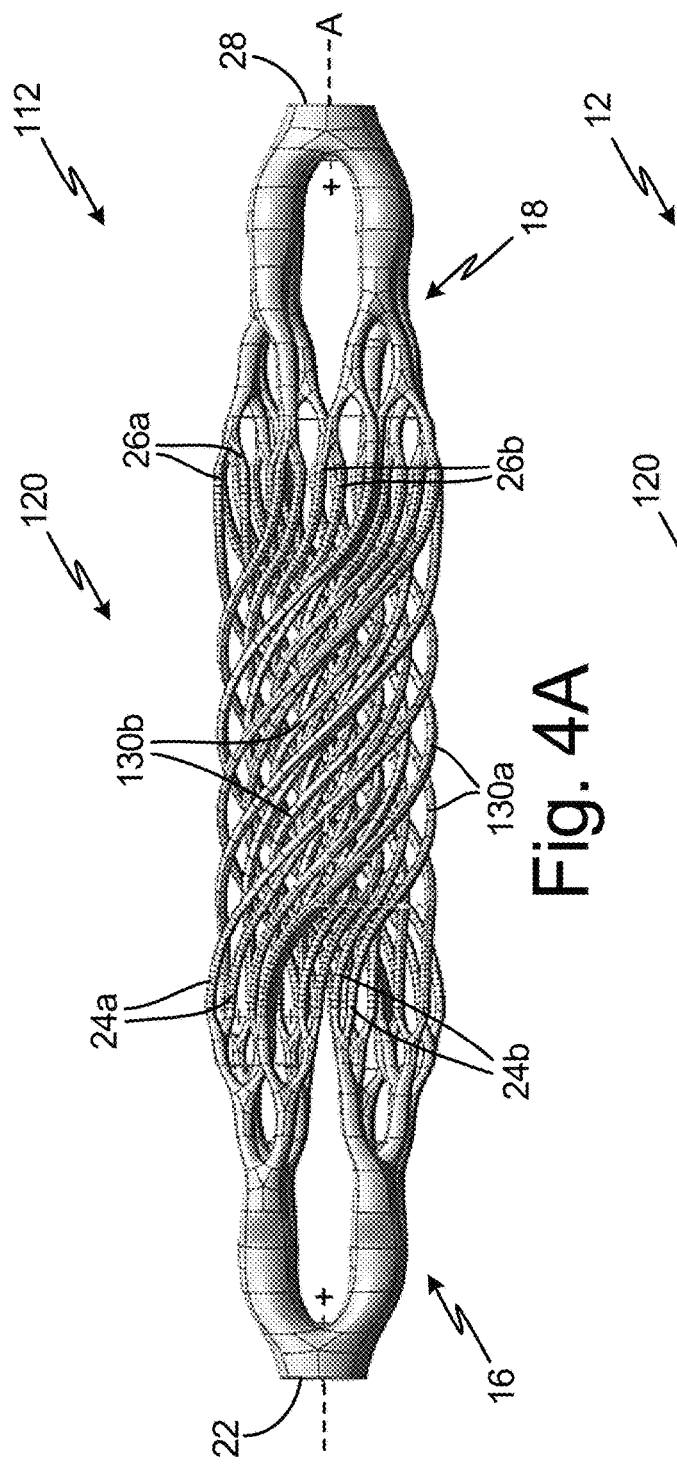
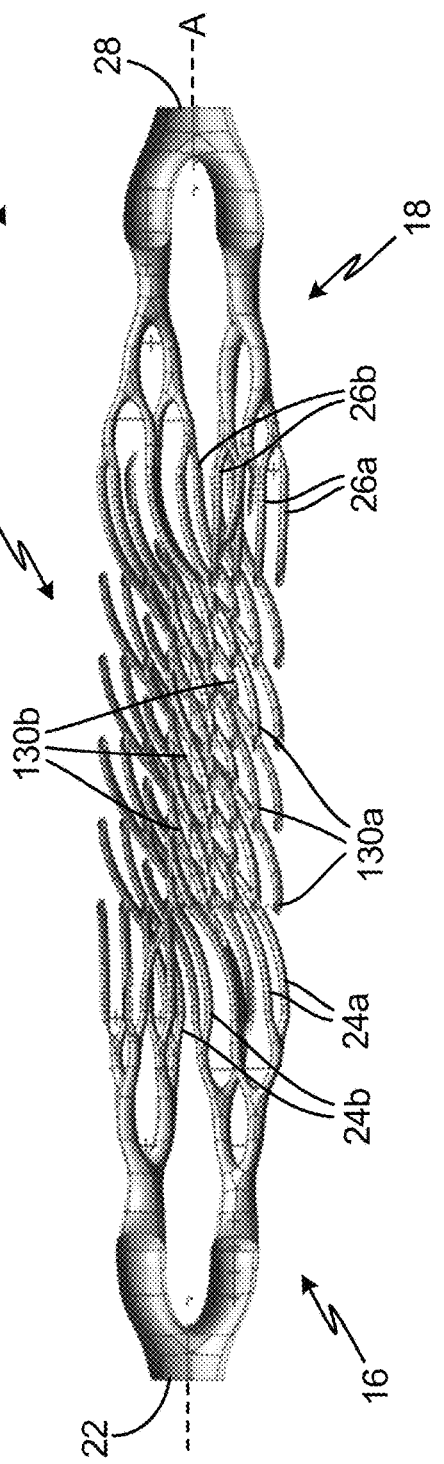
Fig. 4A
Fig. 4B

RADIALLY LAYERED HELICAL CORE GEOMETRY FOR HEAT EXCHANGER

CROSS-REFERENCE TO RELATED APPLICATION(S)

This application claims the benefit of U.S. Provisional Application No. 62/815,838 filed Mar. 8, 2019 for "RADIALLY LAYERED HELICAL CORE GEOMETRY FOR HEAT EXCHANGER" by A. Becene, G. Ruiz, F. Feng, M. Maynard, M. Doe, M. Hu, and E. Joseph.

BACKGROUND

The present disclosure is related generally to heat exchangers and more particularly to heat exchanger core designs.

Heat exchangers can provide a compact, low-weight, and highly effective means of exchanging heat from a hot fluid to a cold fluid. Heat exchangers that operate at elevated temperatures, such as those used in modern aircraft engines, often have short service lifetimes due to thermal stresses, which can cause expansion and cracking of the fluid conduits. Thermal stresses can be caused by mismatched temperature distribution, component stiffness, geometry discontinuity, and material properties (e.g., thermal expansion coefficients and modulus), with regions of highest thermal stress generally located at the interface of the heat exchanger inlet/outlet and core.

A need exists for heat exchangers with increased heat transfer, reduced pressure loss and vibration excitation, and improved performance under thermal stresses.

SUMMARY

In one aspect, the present disclosure is directed toward a heat exchanger with a tubular inlet, a tubular outlet, and a core. The core fluidically connects the tubular inlet to the tubular outlet via a first plurality of tubes and a second plurality of tubes, all of which have a helical shape. The first plurality of tubes is nested radially outwardly of the second plurality of tubes.

In another aspect, the present disclosure is directed toward a heat exchanger with a first fluid manifold extending along a first fluid axis from a first fluid inlet to a first fluid outlet. The first fluid manifold includes a first fluid inlet header, a first fluid outlet header, and a nested helical core section. The first fluid inlet header is disposed to fork the first fluid inlet into a plurality of first fluid branches distributed circumferentially and radially about the first fluid axis. The first fluid outlet header is disposed to combine the plurality of first fluid branches into the first fluid outlet. The nested helical core section fluidly connects the first fluid inlet header to the first fluid outlet header via a plurality of nested helical tubes, and includes radially inner and outer groups of circumferentially distributed helical tubes.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 4A is a side view of a fluid manifold of an alternative heat exchanger with a multi-layered helical core.

FIG. 4B is a cross-sectional side view of the fluid manifold of FIG. 4A.

Figure 1:
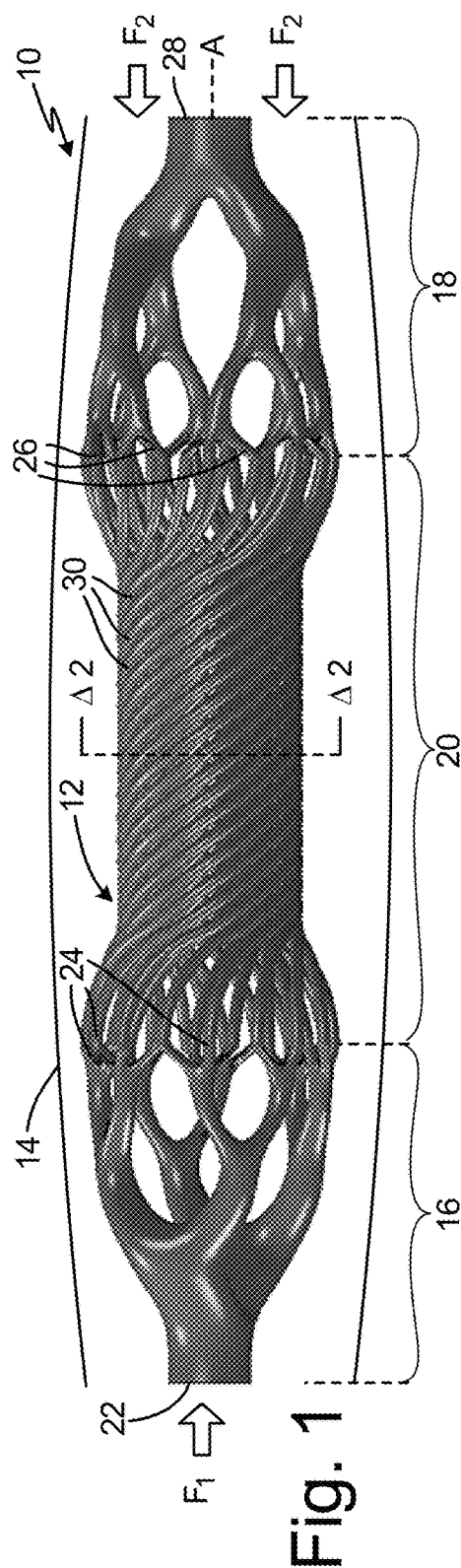
FIG. 1 is schematized side view of a heat exchanger with a helical core.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A heat exchanger with a rotationally symmetric helical core is presented herein. This helical core is made up of at least two radial groups of structurally independent, circumferentially distributed and nested helical tubes. These tubes can be distributed in a nested spring arrangement. These groups can be internally uniform, but differ from each other in at least some characteristics (e.g. helix angle, tube diameter/area, and/or tube wall thickness). These differences allow heat transfer to be equalized across groups, where differences in group radial location within the heat exchanger would otherwise produce variations in heat transfer efficiency, e.g. due to differences in fluid flow path length or exposure to cooling airflow. The helical geometry of the core additionally increases heat exchanger functional length and surface area as a function of the total axial length of the core, and provides structural compliance that allows the core to serve as a spring to relieve thermal and other stresses from the heat exchanger and adjacent (connecting) flow elements.

FIG. 1 is a schematized side view of heat exchanger 10, which includes first fluid manifold 12 and second fluid guide 14. First fluid manifold 12 includes inlet header 16, outlet header 18, and core section 20. Inlet header 16 forks from inlet passage 22 into a plurality of inlet header branches 24, and outlet header 18 recombines outlet header branches 26 into outlet passage 28. Core 20 is formed of a plurality of structurally independent helical tubes 30 that each extend from a separate inlet header branch 24 to a separate outlet header branch 26. The detailed structure of core 20, which includes multiple radially segregated groups of helical tubes 30 (30a, 30b) is described in further detail with reference to subsequent figures.

During operation of heat exchanger 10, hot fluid flow F1 is provided to inlet header 16, flows through core 20, and exits through outlet header 18. Thermal energy is transferred from hot fluid flow F1 to cooling fluid flow F2 as hot fluid flow F1 passes through core 20. It will be understood by one of ordinary skill in the art that the disclosed independent cold flow structure can be tailored for use with a wide variety of core geometries and is not limited to the embodiments shown. Furthermore, although the present disclosure refers to some flow as "cold" and other as "hot," the present geometry can more generally be applied to any two fluid flows in a heat exchange relationship, e.g. wherein F1 and F2 are exchanged i.e. as cold and hot flows, respectively.

As illustrated in FIG. 1, heat exchanger 10 is oriented substantially symmetrically along a fluid axis A, which connects extends from inlet passage 22 to outlet passage 28. In this embodiment, axis A is a straight line defining a primary flow direction of hot fluid flow F1 through first fluid manifold 12. In variations on the depicted embodiment, however, heat exchanger 10 can extend along a contoured (non-straight) axis, e.g. due to space constraints.

Headers 16, 18 distribute and receive fluid, respectively, substantially evenly across core 20. Specifically, inlet header 16 splits into inlet header branches 24, and outlet header 18 recombines from header branches 26. In the illustrated embodiment, header 16 is a successively fractally branching manifold with multiple stages of branches, each narrowing in cross-sectional flow area with respect to the previous stage of less numerous branches, finally terminating in the full count of outlet header branches 22 as the narrowest and most axially distant from inlet passage 22. More specifically, the present figures illustrate each stage of header 16 branching rotationally symmetrically about axis A into an even number of tubes evenly circumferentially distributed across a common plane transverse to axis A. More generally, however, header 16 can be of any shape capable of distributing fluid from a single source at inlet passage 22 across the multitude of separate helical tubes 30 of core 20. The illustrated embodiment, however, advantageously reduces pressure drop and provides additional mechanical compliance along axis A, within header 16.

As depicted in FIG. 1, header 18 substantially mirrors header 16, across core 20. In at least some embodiments, headers 16, 18 and core 20 are all formed monolithically. More generally, all components of heat exchanger first fluid manifold 12 can be formed partially or entirely by additive manufacturing. For metal components (e.g., Inconel, aluminum, titanium, etc.) exemplary additive manufacturing processes include but are not limited to powder bed fusion techniques such as direct metal laser sintering (DMLS), laser net shape manufacturing (LNSM), electron beam manufacturing (EBM). For polymer or plastic components, stereolithography (SLA) can be used. Additive manufacturing is particularly useful in obtaining unique geometries (e.g., varied core tube radii, arcuate core tubes, branched inlet and outlet headers) and for reducing the need for welds or other attachments (e.g., between headers 16, 18 and core 20). However, other suitable manufacturing process can be used. For example, header and core elements can in some embodiments be fabricated separately and joined via later manufacturing steps.

Second fluid guide 14 is illustrated schematically in FIG. 1. Second fluid guide 14 can be included in some embodiments to constrain cooling fluid flow F2. Second fluid guide 14 is illustrated as a baffle surrounding mechanically unconnected to first fluid manifold 12. In other embodiments, second fluid guide 14 can have additional sub-layers or separations to further channel cooling fluid flow F2 through and across first fluid manifold 12. In still other embodiments, by contrast, second fluid guide 14 can be omitted altogether, and first fluid manifold 12 directly exposed to an unconstrained environment of cooling fluid flow F2. Second fluid guide 14 need not closely match the geometry of first fluid manifold 12, but can in some embodiments parallel at least some aspects of the geometry of first fluid manifold, e.g. to more closely capture core section 20 as a whole. In the illustrated embodiment, second fluid guide 14 channels cooling fluid flow F2 in a direction substantially antiparallel (i.e. parallel to but opposite) hot fluid flow F1. In other embodiments, second fluid guide 14 can instead direct cooling fluid flow F2 in a direction transverse to F1, e.g. in a cross-flow direction.

Figure 2:
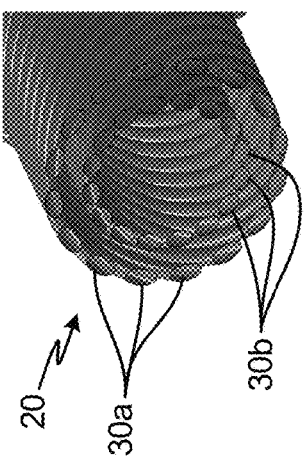
FIG. 2 is a cross-sectional perspective view of the helical core of FIG. 1.

FIG. 2 is a cross-sectional view of core section 20 of first fluid manifold 12, through a section plane illustrated as 2-2 in FIG. 1. FIG. 2 illustrates two distinct radial groupings of helical tubes 30: outer tubes 30a and inner tubes 30b. This distribution of tubes permits increased packing density of fluid flow F2 through fluid manifold 12. Within each grouping, tubes 30a, 30b can be substantially geometrically uniform, both with respect to internal geometry (e.g. flow diameter and cross-sectional shape) and external geometry (e.g. radial location with respect to axis A and circumferential spacing between adjacent tubes of the same group). Tubes 30a can differ from tubes 30b, however, in any or all of these characteristics, so as to better normalize fluid and heat properties (heat transfer, fluid flow rate, pressure drop) across all helical tubes, and to adjust mechanical properties (compliance under thermal loads, susceptibility to vibrational excitation) of first fluid manifold 12 and heat exchanger 10 as a whole. For example, outer tubes 30a can have greater wall thickness than inner tubes 30b, to provide comparable bending stiffness between tube groupings 30a, 30b. Similarly, tube flow diameter can be adjusted to substantially equalize the proportion of fluid flow F1 passing through each tube 30, despite differences in radial position. For example, inner tubes 30b can, in some embodiments, have reduced flow diameter/area compared to outer tubes 30a. Although FIG. 2 depicts tube groupings 30a, 30b as both having clockwise helical angles in a flow direction, some embodiments of core 20 can include tube groupings 30a, 30b with opposing orientations to promote turbulence and resulting heat exchange between fluid flows F1 and F2.

Although FIG. 2 depicts only two radially segregated groups of helical tubes 30, the present invention can be more broadly applied to a larger number of groupings of helical tubes. Additionally, although FIG. 2 illustrates outer and inner groupings of tubes 30a, 30b has having identical numbers of distinct tubes 30, this need not be the case. In some embodiments, core 20 can for example include a larger number of outer tubes 30a than inner tubes 30b, to accommodate packing constraints and ensure adequate spacing between inner tubes 30b for cooling fluid flow F2. Embodiments of core 20 wherein different radial groupings include different numbers of matched tubes will require asymmetric branching at headers 16, 18, e.g. with more stages of fractal branches leading to some groupings than others, or with more numerous forking.

The majority of heat transfer enabled by heat exchanger 10 is accomplished within core section 20. Core section is formed by a plurality of separate, structurally independent helical tubes 30. Each helical tube 30 has a helical or spring-like geometry, extending axially and turning in common about fluid axis A. Helical tubes 30a, 30b are nested circumferentially with respect to other tubes of the same set, and coaxially with respect to the other set. Each helical tube 30a, 30b can be substantially identical to all other tubes 30a, 30b, respectively, but shifted circumferentially relative to adjacent tubes. All tubes 30a, 30b are depicted as cross-sectionally distributed in circular arrays at an outer and inner radius of core 20, respectively, in circular arrays across a plane orthogonal to fluid axis A. More generally, tubes 30 can be distributed in combination of arrays with rotational symmetry about fluid axis A, e.g. in elliptical or cloverleaf patterns. Circular symmetry in the distribution of tubes 30 permits each of tubes 30a, 30b to have identical geometry within their respective groups, with correspondingly identical and therefore uniform fluid flow and heat transfer characteristics. Asymmetric arrangements of tubes 30, however, may be advantageous in tight space constraints, or where cooling fluid flow F2 is non-uniform. The shortest spacing between circumferentially adjacent helical tubes 30a, 30b is primarily circumferential (but partly axial), which provides a substantially uniform gap spacing between all adjacent tubes 30a, 30b, so as to promote even airflow F2 therebetween. Radial separation between groups 30a, 30b can, in some embodiments, at least exceed circumferential spacing between tubes of the same grouping, so as to promote cooling fluid flow F2 between tube groupings. All helical tubes 30a, 30b within a single grouping can have a substantially identical and uniform inner diameter with a circular cross-section, resulting in equal cross-sectional areas. In the illustrated embodiment, the spacing between circumferentially adjacent helical tubes 30 is greater than this inner diameter.

Figure 3:
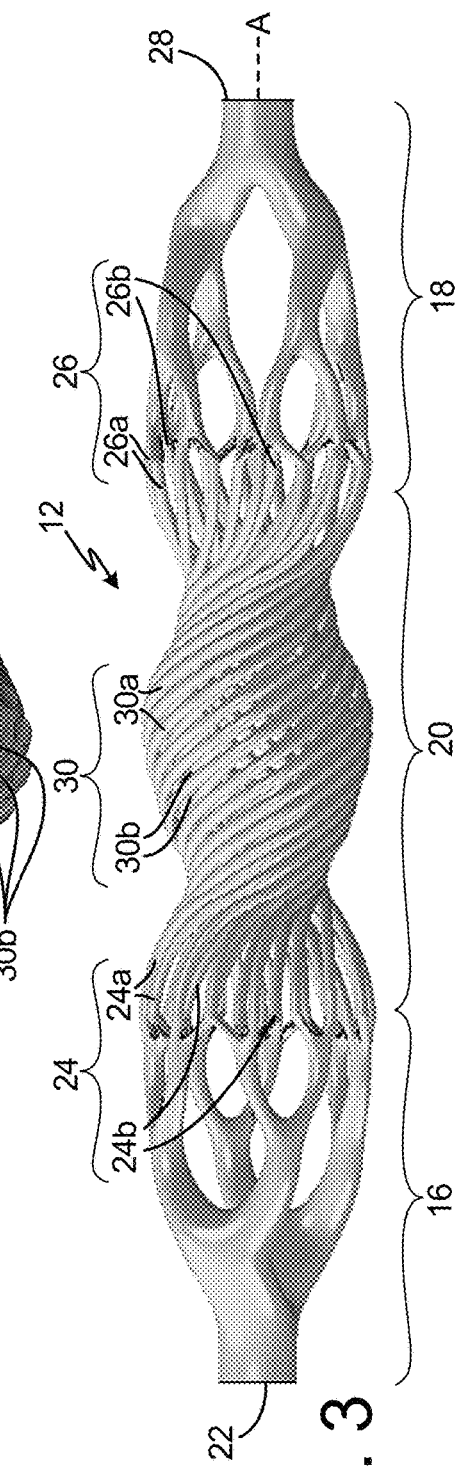
FIG. 3 is an exaggerated perspective side view of the heat exchanger of FIG. 1, in a compressed state.

The helical shape of tubes 30 of core 20 serves several functions. First, helical tubes 30 have no sharp corners or interfaces (e.g. with headers 16, 18), and consequently reduce unnecessary pressure losses. Second, helical tubes 30 are compliant along axis A, acting as a spring capable of deforming to accommodation expansion or axial translation of adjacent components. In particular, helical tubes 30 can be capable of compliantly deforming along axis A so as to accommodate thermal growth of headers 16, 18, and/or translation of headers 16, 18 due to thermal growth of adjacent (upstream or downstream) components. This mechanical compliance provided by core 20 allows heat exchanger to better distribute and weather thermal and other mechanical stresses. FIG. 2 is an exaggerated (not to scale) perspective side view of heat exchanger 10 illustrating a compressed state of first fluid manifold 12. FIG. 3 illustrates the performance of core section 20 under such compression. FIG. 3 additionally illustrates the forking structures of headers 16, 18 whereby inlet header 16 diverges into a plurality of inlet header branches 24 including both outer inlet header branches 24a (connected with outer helical tubes 30a) and outer header branches 24b (connected to inner helical tubes 30b). Outlet header 18 similarly recombines a plurality of outlet header branches 26 including both outer outlet header branches 26a (connected to outer helical tubes 30a) and inner outlet header branches 26b (connected to outer helical tubes 30b). Embodiments of core 20 wherein outer tubes 30a outnumber inner tubes 30b (or vice versa) will necessarily have unequal numbers of inner header branches 24a/26a vs. outer header branches 24b/26b.

FIG. 4A is a side view of a fluid manifold of an alternative first fluid manifold 112 with an alternative multi-layered helical core 120. FIG. 4B is a cross-sectional side view of first fluid manifold 112. In the illustrated embodiment, first fluid manifold 112 differs from previously discussed first fluid manifold 12 in that helical core 120 includes radially separate groupings of helical tubes 30 with different helix angles. Helical core 120 includes inner and outer helical tubes 130a, 130b, respectively. As shown in FIGS. 4A and 4B, inner helical tubes 130b have a steeper helix angle (i.e. with respect to axis A) than outer helical tubes 130a, resulting in a larger number of total turns of inner helical tubes 130b relative to outer helical tubes 130a. This increased number of turns for the inner grouping of tubes partially or completely offsets the increase to the path length of helical tubes 130a relative to 130b caused by difference in radius. Without adjusting helix angle, helical tubes 30b would provide a significantly shorter path for fluid flow F1 compared to helical tubes 30a, resulting in unnecessary pressure losses and potentially worsened heat exchange between fluid flows F1 and F2. First fluid manifold 112 otherwise operates generally as described above with respect to fluid manifold 12, and can exhibit other differences (material, geometric) between groupings of helical tubes 30a and 30b as described therein.

In at least some embodiments, helical core 20 is significantly less compliant laterally, i.e. in dimensions transverse to fluid axis A. This increased lateral stiffness provides first fluid manifold 12 with resonant frequencies of oscillation transverse to the first fluid flow that are greater than the range of operating frequencies of a surrounding engine or other components for at least its three highest amplitude natural frequencies, for example, so as to avoid excitation within the expected environment of heat exchanger 10. The generally circular cross-section of each tube 30 contributes to this increased lateral stiffness. Cross-sectional geometry (e.g. elliptical, circular, oblong), wall stiffness, helix angle, to and material can all be varied between radial groupings of tubes 30 to increase consistency of heat exchange or mechanical properties of first fluid manifold 12 across tube groupings. As mentioned previously, adjustments to dimensions, shapes, and/or materials of tubes 30a, 30b can enable substantial uniformity of stiffness between tube groupings 30a and 30b, despite necessary geometric differences due to differences in radial location of the respective groups. The helical geometry of tubes 30 also provides greater fluid flow length within each tube 30, and correspondingly greater surface area exposed to cooling fluid flow F2. The overall passage length of each tube 30 can, for example, be double the axial length of core 30, or more. Helical tubes 30 can introduce additional turbulence to fluid flows F1, F2, for additional heat transfer.

In view of the above, in comparison to conventional straight-line connected channels, core 20 provides heat exchanger 10 with improved axial compliance to handle thermal stresses, increased lateral stiffness to avoid potentially harmful resonance conditions, and increased surface area exposed to cooling fluid flow F2 for greater heat exchange, all with only modest pressure losses from inlet passage 22 to outlet passage 28. Furthermore, the geometry of core 20 is symmetrical along two axes (axial and radial), and can consequently improve the uniformity of stress distribution across first fluid manifold 12. By varying characteristics of helical tubes 30 between radial groupings, the present disclosure enables multiple radial groupings to be used for higher packing density and heat transfer efficiency, without deleterious consequences to heat transfer uniformity, flow rate, pressure losses, or vibrational characteristics of heat exchanger 10.

Discussion of Possible Embodiments

The following are non-exclusive descriptions of possible embodiments of the present invention.

A heat exchanger apparatus comprising: a tubular inlet; a tubular outlet; and a core fluidically connecting the tubular inlet to the tubular outlet via a first plurality of tubes and a second plurality of tubes all of which have a helical shape, the first plurality of tubes being nested radially outwardly of the second plurality of tubes.

A heat exchanger comprising: a first fluid manifold extending along a first fluid axis from a first fluid inlet to a first fluid outlet, the first fluid manifold comprising: a first fluid inlet header disposed to fork the first fluid inlet into a plurality of first fluid branches distributed circumferentially and radially about the first fluid axis; a first fluid outlet header disposed to combine the plurality of first fluid branches into the first fluid outlet; and a nested helical core section fluidly connecting the first fluid inlet header to the first fluid outlet header via a plurality of nested helical tubes the nested helical core section comprising: a radially inner group of circumferentially distributed helical tubes; and a radially outer group of circumferentially distributed helical tubes, disposed radially outward of the radially inner group of circumferentially distributed helical tubes, with respect to the fluid axis.

The heat exchanger of the preceding paragraph can optionally include, additionally and/or alternatively, any one or more of the following features, configurations and/or additional components:

A further embodiment of the foregoing heat exchanger, wherein each of the plurality of helical tubes is structurally independent from all others of the plurality of helical tubes, such that the plurality of helical tubes are mechanically connected to each other only at the first fluid inlet header and the first fluid outlet header.

A further embodiment of the foregoing heat exchanger, wherein each of the plurality of helical tubes extends axially along and circumferentially about the first fluid axis.

A further embodiment of the foregoing heat exchanger, wherein the first fluid axis extends linearly from the first fluid inlet passage to the first fluid outlet passage, and wherein the first fluid inlet and the first fluid outlet are themselves oriented along the first fluid axis.

A further embodiment of the foregoing heat exchanger, wherein all of the radially inner group of circumferentially distributed helical tubes have first identical geometries, and wherein all of the radially outer group of circumferentially distributed helical tubes have second identical geometries, that differ from the first identical geometries.

A further embodiment of the foregoing heat exchanger, wherein the first and second identical geometries are defined at least in part by helix angle, tube wall thickness, and tube flow diameter, such that all of the helical tubes of the radially inner group of circumferentially distributed helical tubes have identical helix angle, tube wall thickness, and tube flow diameter, all of the helical tubes of the radially outer group of circumferentially distributed helical tubes have identical helix angle, tube wall thickness, and tube flow diameter, and all of the helical tubes of the radially inner group of circumferentially distributed helical tubes differ from all of the helical tubes of the radially outer group of circumferentially distributed helical tubes in at least one of the group consisting of helix angle, tube wall thickness, and tube flow diameter.

A further embodiment of the foregoing heat exchanger, wherein the helix angle all of the helical tubes of the radially inner group of circumferentially distributed helical tubes is greater than the helix angle of all of the helical tubes of the radially outer group of circumferentially distributed helical tubes.

A further embodiment of the foregoing heat exchanger, wherein the tube wall thickness all of the helical tubes of the radially inner group of circumferentially distributed helical tubes is less than the tube wall thickness of all of the helical tubes of the radially outer group of circumferentially distributed helical tubes.

A further embodiment of the foregoing heat exchanger, wherein the flow diameter all of the helical tubes of the radially inner group of circumferentially distributed helical tubes is less than the flow diameter of all of the helical tubes of the radially outer group of circumferentially distributed helical tubes.

A further embodiment of the foregoing heat exchanger, wherein the tubes of the radially outer group of circumferentially distributed helical tubes are more numerous than the tubes of the radially inner group of circumferentially distributed helical tubes.

A further embodiment of the foregoing heat exchanger, wherein each of the plurality of helical tubes is mechanically separated from circumferentially adjacent of the plurality of helical tubes by a circumferential and axial gap.

A further embodiment of the foregoing heat exchanger, wherein each of plurality of helical tubes has a total passage length at least double its extent along the first fluid axis.

A further embodiment of the foregoing heat exchanger, wherein the nested helical core section forms a nested double spring shape extending between the first fluid inlet header and the first fluid outlet header, wherein the nested double spring shape is principally compliant along the first fluid axis.

A further embodiment of the foregoing heat exchanger, further comprising a second fluid flow structure disposed to direct a second fluid to impinge on the first fluid manifold, wherein the second fluid flow structure is configured to direct the second fluid generally along a direction from the first fluid outlet to the first fluid inlet.

A further embodiment of the foregoing heat exchanger, wherein the entirety of the first fluid manifold is formed monolithically as a single structure.

A further embodiment of the foregoing heat exchanger, wherein all of the plurality of helical tubes have substantially identical flow path length.

A further embodiment of the foregoing heat exchanger, wherein all of the plurality of helical tubes have a circular cross-section.

A further embodiment of the foregoing heat exchanger, wherein the first fluid inlet header and the first fluid outlet header are fractally arranged structures with successive forks between less numerous branches with wider flow area and more numerous branches with narrower flow area.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a first fluid manifold extending along a first fluid axis defining an axial direction from a first fluid inlet to a first fluid outlet, the first fluid manifold comprising:
   a first fluid inlet header disposed to fork the first fluid inlet fractally into a plurality of helical tubes distributed circumferentially and radially about the first fluid axis, the first fluid inlet header comprising:
   a plurality of inlet header branches split directly from the first fluid inlet at a shared inlet intersection and extending at least partially in the axial direction therefrom; and
   a plurality of secondary inlet branch intersections each separating one of the inlet header branches into multiple branches selected from among the plurality of helical tubes;
   a first fluid outlet header disposed to recombine the plurality of helical tubes into the first fluid outlet, the first fluid outlet comprising:
   a plurality of secondary outlet header intersections each combining multiple branches selected from among the plurality of helical tubes;
   a plurality of outlet header branches each extending from one of the plurality of secondary outlet header intersections and all combining at a shared outlet intersection, the outlet header branches extending at least partially in the axial direction from the plurality of secondary outlet header intersections to a shared outlet intersection; and
   a nested helical core section fluidly connecting the first fluid inlet header to the first fluid outlet header via the plurality of nested helical tubes, the nested helical core section comprising:
   a radially inner group of circumferentially distributed helical tubes comprising a first subset of the plurality of helical tubes; and
   a radially outer group of circumferentially distributed helical tubes, comprising a second subset of the plurality of helical tubes separate from the first subset of the plurality of helical tubes, and disposed radially outward of the radially inner group of circumferentially distributed helical tubes, with respect to the fluid axis,
   wherein each of the pluralities of inlet header branches, outlet header branches, secondary inlet branch intersections, and secondary outlet header intersections, is spaced apart from and structurally independent from all other inlet header branches, outlet header branches, secondary inlet branch intersections, and secondary outlet header intersections, respectively, such that all inlet and outlet header branches are structurally connected to other inlet and outlet header branches, respectively, only at the shared inlet intersection or shared outlet intersection, respectively, and such that no secondary inlet or outlet header intersections are directly attached to any other secondary inlet or outlet header intersections, respectively.

2. The heat exchanger of claim 1, wherein each of the plurality of helical tubes is structurally independent from all others of the plurality of helical tubes, such that the plurality of helical tubes are mechanically connected to each other only at the first fluid inlet header and the first fluid outlet header.

3. The heat exchanger of claim 1, wherein each of the plurality of helical tubes extends axially along and circumferentially about the first fluid axis.

4. The heat exchanger of claim 1, wherein the first fluid axis extends linearly from the first fluid inlet to the first fluid outlet, and wherein the first fluid inlet and the first fluid outlet are themselves oriented along the first fluid axis.

5. The heat exchanger of claim 1, wherein all of the radially inner group of circumferentially distributed helical tubes have first identical geometries, and wherein all of the radially outer group of circumferentially distributed helical tubes have second identical geometries, that differ from the first identical geometries.

6. The heat exchanger of claim 1, wherein the first and second identical geometries are defined at least in part by helix angle, tube wall thickness, and tube flow diameter, such that all of the helical tubes of the radially inner group of circumferentially distributed helical tubes have identical helix angle, tube wall thickness, and tube flow diameter, all of the helical tubes of the radially outer group of circumferentially distributed helical tubes have identical helix angle, tube wall thickness, and tube flow diameter, and all of the helical tubes of the radially inner group of circumferentially distributed helical tubes differ from all of the helical tubes of the radially outer group of circumferentially distributed helical tubes in at least one of the group consisting of helix angle, tube wall thickness, and tube flow diameter.

7. The heat exchanger of claim 6, wherein the helix angle all of the helical tubes of the radially inner group of circumferentially distributed helical tubes is greater than the helix angle of all of the helical tubes of the radially outer group of circumferentially distributed helical tubes.

8. The heat exchanger of claim 6, wherein the tube wall thickness all of the helical tubes of the radially inner group of circumferentially distributed helical tubes is less than the tube wall thickness of all of the helical tubes of the radially outer group of circumferentially distributed helical tubes.

9. The heat exchanger of claim 6, wherein the flow diameter all of the helical tubes of the radially inner group of circumferentially distributed helical tubes is less than the flow diameter of all of the helical tubes of the radially outer group of circumferentially distributed helical tubes.

10. The heat exchanger of claim 1, wherein the tubes of the radially outer group of circumferentially distributed helical tubes are more numerous than the tubes of the radially inner group of circumferentially distributed helical tubes.

11. The heat exchanger of claim 1, wherein each of the plurality of helical tubes is mechanically separated from circumferentially adjacent of the plurality of helical tubes by a circumferential and axial gap.

12. The heat exchanger of claim 1, wherein each of the plurality of helical tubes has a total passage length at least double its extent along the first fluid axis.

13. The heat exchanger of claim 1, wherein the nested helical core section forms a nested double spring shape extending between the first fluid inlet header and the first fluid outlet header, wherein the nested double spring shape is principally compliant along the first fluid axis.

14. The heat exchanger of claim 1, further comprising a second fluid flow structure disposed to direct a second fluid to impinge on the first fluid manifold, wherein the second fluid flow structure is configured to direct the second fluid generally along a direction from the first fluid outlet to the first fluid inlet.

15. The heat exchanger of claim 1, wherein the entirety of the first fluid manifold is formed monolithically as a single structure.

16. The heat exchanger of claim 1, wherein all of the plurality of helical tubes have substantially identical flow path length.

17. The heat exchanger of claim 1, wherein all of the plurality of helical tubes have a circular cross-section.

* * * * *